United States Patent
Tamura et al.

(10) Patent No.: US 6,877,864 B1
(45) Date of Patent: Apr. 12, 2005

(54) PROJECTOR AND METHOD OF CORRECTING IMAGE DISTORTION

(75) Inventors: Youichi Tamura, Tokyo (JP); Youichi Itaki, Tokyo (JP)

(73) Assignee: NEC Viewtechnology, Ltd. (JP)

(*) Notice: Subject to any disclaimer, the term of this patent is extended or adjusted under 35 U.S.C. 154(b) by 0 days.

(21) Appl. No.: 10/789,686

(22) Filed: Feb. 27, 2004

(30) Foreign Application Priority Data

Feb. 16, 2004 (JP) .......................... 2004-037961

(51) Int. Cl.$^7$ .............. G03B 21/26; G03B 21/00; G03B 21/14; G03B 41/02; G09G 5/00
(52) U.S. Cl. .............. 353/70; 353/30; 353/101; 353/121; 345/748; 359/701; 352/105
(58) Field of Search .............. 353/30, 69, 70, 353/100, 101, 121; 345/748, 806; 359/701; 352/105

(56) References Cited

U.S. PATENT DOCUMENTS

| | | | | |
|---|---|---|---|---|
| 6,592,228 B1 | * | 7/2003 | Kawashima et al. | ........ 353/101 |
| 6,652,104 B2 | * | 11/2003 | Nishida et al. | ............... 353/70 |
| 2004/0046943 A1 | * | 3/2004 | Muramatsu | .................. 353/70 |

FOREIGN PATENT DOCUMENTS

| | | | | |
|---|---|---|---|---|
| JP | 2000-241874 | 9/2000 | ........... | G03B/21/00 |
| JP | 2001-186538 | 7/2001 | ............ | H04N/9/31 |
| JP | 2001-249401 | 9/2001 | ........... | G03B/21/00 |
| JP | 2002-051279 | 2/2002 | ............ | H04N/5/74 |
| JP | 2002-189442 | 7/2002 | ............ | G09G/3/20 |
| JP | 2002-262198 | 9/2002 | ............ | H04N/5/74 |
| JP | 2003-005278 | 1/2003 | ........... | G03B/21/00 |

* cited by examiner

*Primary Examiner*—Judy Nguyen
*Assistant Examiner*—Melissa J Koval
(74) *Attorney, Agent, or Firm*—Hayes Soloway P.C.

(57) ABSTRACT

Projector has projection optical system for projecting an image onto a projection surface and optical zoom mechanism for actuating projection optical system to enlarge and reduce the image projected onto the projection surface. Projector also has distortion correcting circuit for correcting distorted quadrilateral projected images, which are projected onto the projection surface along an optical axis that is oblique vertically and horizontally to the projection surface, into respective square corrected images, zoom setting detector for detecting a zoom setting of optical zoom mechanism, and CPU for generating corrective data to be set in distortion correcting circuit based on the zoom setting detected by zoom setting detector.

8 Claims, 6 Drawing Sheets

PROJECTOR AND METHOD OF CORRECTING IMAGE DISTORTION

BACKGROUND OF THE INVENTION

1. Field of the Invention

The present invention relates to a projector for projecting images onto a projection surface such as a screen or the like, and more particularly to a projector for correcting distortion of images to be projected onto a projection surface and projecting distortion-corrected images onto the projection surface, and a method of correcting such distortion of images to be projected onto a projection surface.

2. Description of the Related Art

Projectors are often limited to certain installation positions in the environments in which they are used, and project images onto a projection surface such as a screen or the like along an optical axis that is oblique to the projection surface. In such a case, when an image having a square image area is projected onto the projection surface, the projected image suffers a trapezoidal or quadrilateral distortion. Therefore, conventional projectors have a distortion correcting circuit for performing a keystone distortion process to correct a projected image with trapezoidal distortion into a square image.

In recent years, projectors are in general use to have a distortion correcting circuit for automatically correcting image distortion in the vertical direction of the projection surface and manually correcting image distortion in the horizontal direction. One conventional projector of this type is a liquid crystal projector having an acceleration sensor for detecting a vertically inclined angle of the optical axis along which images are projected onto the projection surface, as disclosed in Japanese laid-open patent publication No. 2003-5278, for example.

Other conventional projectors which have found widespread use have, in addition to the distortion correcting circuit, an optical zoom mechanism for enlarging and reducing projected images on the projection surface.

With the conventional projectors which have both the distortion correcting circuit and the optical zoom mechanism, the distortion correcting process is performed, supposing the magnification of the optical zoom mechanism being fixed to an intermediate magnification setting between the telephoto end setting and the wide angle end setting. Therefore, these conventional projectors are disadvantageous in that the distortion correcting circuit is unable to perform the distortion correcting process properly for the other magnification setting.

The reason why the distortion correcting process cannot be performed properly is that distortion of a projected image changes depending on the zoom setting of the optical zoom mechanism. The manner in which distortion of a projected image changes depending on the zoom setting will be described below with reference to FIG. 1.

FIG. 1 shows projector 51 having an angle t of view at the telephoto end setting and an angle w of view at the wide angle end setting. For the sake of brevity, it is assumed in FIG. 1 that the angle w of view at the wide angle end setting is twice the angle t of view at the telephoto end setting (w=2t), and projector 51 has optical axis 55 along which images are projected, optical axis 55 being vertically inclined to a projection surface by an angle t which is equal to the angle t of view at the telephoto end setting.

As shown in FIG. 1, the vertical lengths a, b, c, d of areas of a projected image on the projection surface which are subtended by angles defined by optical axis 55 and the angles t, w of view are related to each other as a<b<c<d. The relationship a<b<c<d Indicates that when the zoom lens, e.g., the projection lens, is moved by the optical zoom mechanism from the telephoto end to the wide angle end, an area of the projected image above the center thereof is enlarged at a ratio greater than an area of the projected image below the center thereof. When the projector projects an image onto the projection surface along the optical axis that is oblique to the projection surface, therefore, the projected image is distorted differently at the telephoto end setting and the wide angle end setting of the optical zoom mechanism.

FIGS. 2A and 2B of the accompanying drawings show images 56, 57, respectively, which are projected onto the projection surface along the optical axis that is oblique to the projection surface in the vertical direction, and also show corrected images 58, 59, respectively, which are obtained by correcting respective distortions of images 56, 57.

The image projected onto the projection surface by the projector suffers a greater distortion when the zoom lens is moved to the wide angle end as shown in FIG. 2B than when the zoom lens is moved to the telephoto end as shown in FIG. 2A. Consequently, the distortion needs to be corrected differently as the zoom setting changes.

It is difficult for the conventional projectors to correct distortion of projected images which changes depending on the zoom setting. If images are projected onto the projection surface along an optical axis that is oblique to the projection surface in both vertical and horizontal directions, then it is more difficult for the conventional projectors to correct distortion of the projected images which changes depending on the zoom setting.

SUMMARY OF THE INVENTION

It is therefore an object of the present invention to provide a projector which is capable of correcting distortion of projected images properly regardless of different zoom settings of an optical zoom means, even when the images are projected onto a projection surface along an optical axis that is oblique to the projection surface in both vertical and horizontal directions, and a method of correcting such distortion of images to be projected onto a projection surface.

To achieve the above object, there is provided in accordance with the present invention a projector having a projection optical system for projecting an image onto a projection surface and optical zoom means for actuating the projection optical system to enlarge and reduce the image projected onto the projection surface. The projector also has distortion correcting means for correcting a distorted quadrilateral image which is projected onto the projection surface when an optical axis of the projection optical system is oblique to the projection surface in vertical and horizontal directions, into a square corrected image, zoom setting detecting means for detecting a zoom setting of the optical zoom means, and corrective data generating means for generating corrective data to be set in the distortion correcting means based on the zoom setting detected by the zoom setting detecting means.

With the projector thus arranged, the distortion correcting means corrects a quadrilateral projected image Into a square corrected image based on the corrective data entered from the corrective data generating means. Therefore, even when the zoom setting of the optical zoom means is changed, the distortion correcting means corrects image distortion accurately. The projector can thus perform an accurate distortion correcting process depending on the zoom setting of the optical zoom means.

According to the present invention, there is also provided a method of correcting image distortion, comprising the steps of providing a projector having a projection optical system for projecting an image onto a projection surface, and optical zoom means for actuating the projection optical system to enlarge and reduce the image projected onto the projection surface, detecting a zoom setting of the optical zoom means, generating corrective data based on the zoom setting which is detected, and correcting a distorted quadrilateral image which is projected onto the projection surface when an optical axis of the projection optical system is oblique to the projection surface in vertical and horizontal directions, into a square corrected image based on the corrected data which is generated.

The above and other objects, features, and advantages of the present invention will become apparent from the following description with reference to the accompanying drawings which illustrate examples of the present invention.

DESCRIPTION OF THE PREFERRED EMBODIMENT

Figure 1:
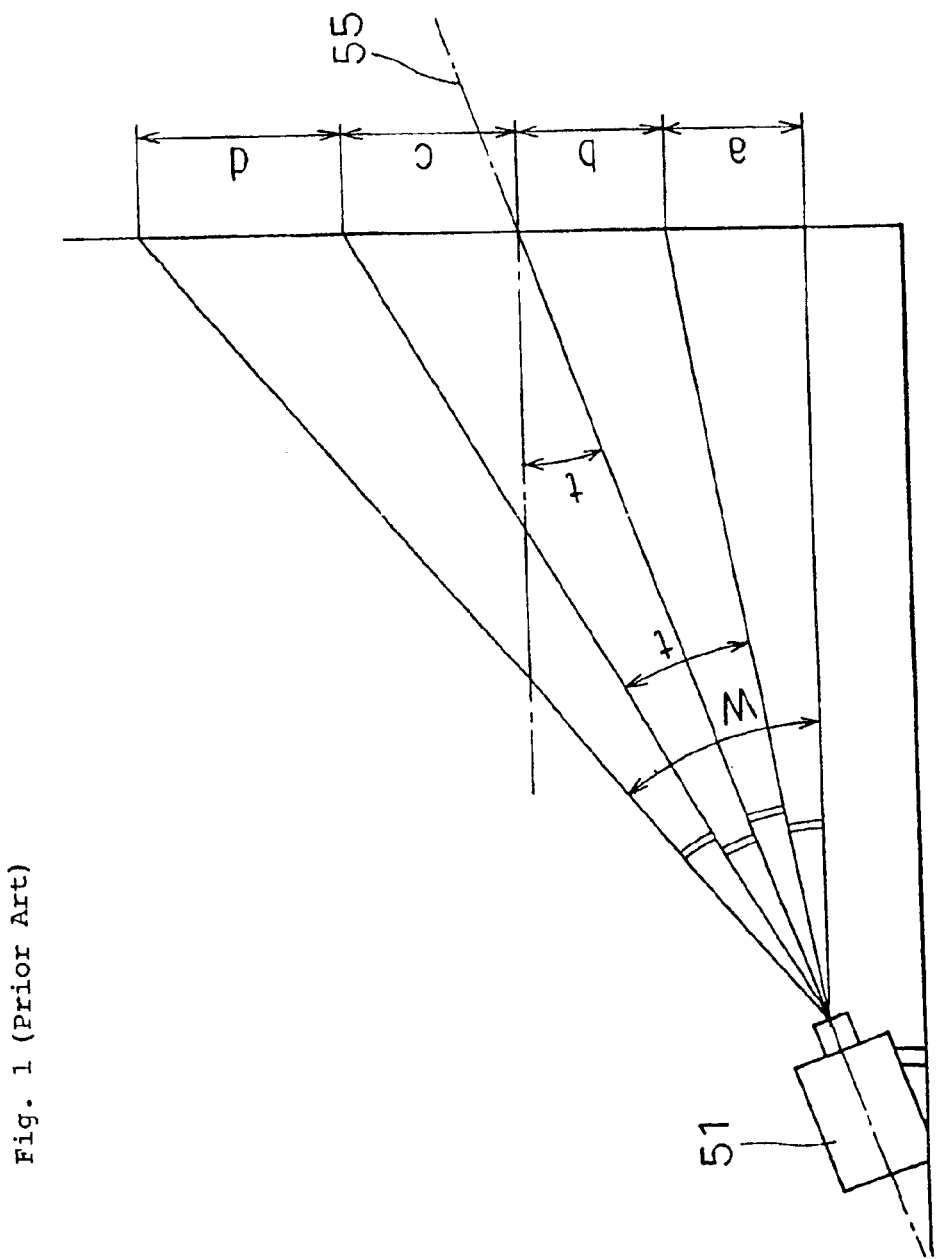
FIG. 1 is a schematic view illustrative of changes of distortion of projected images when a zoom lens moves to telephoto and wide angle ends.
Figure 2B:
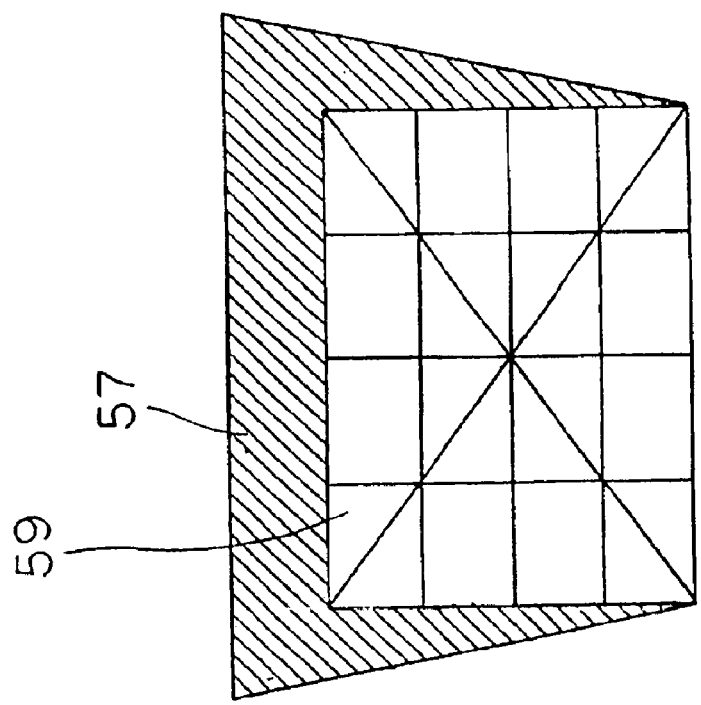
FIG. 2B is a schematic view showing the relationship between a projected image that is displayed when the zoom lens is moved to the wide angle end and a corrected image that is obtained by correcting distortion of the projected image.
Figure 2A:
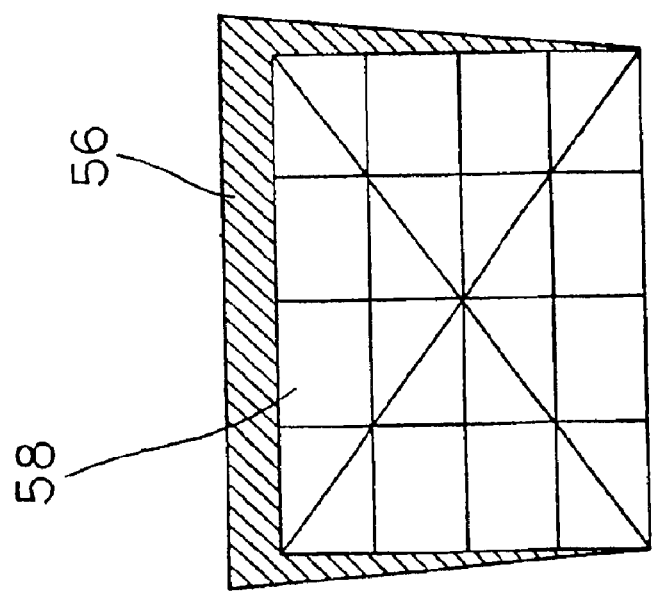
FIG. 2A is a schematic view showing the relationship between a projected image that is displayed when the zoom lens is moved to the telephoto end and a corrected image that is obtained by correcting distortion of the projected image.
Figure 3:
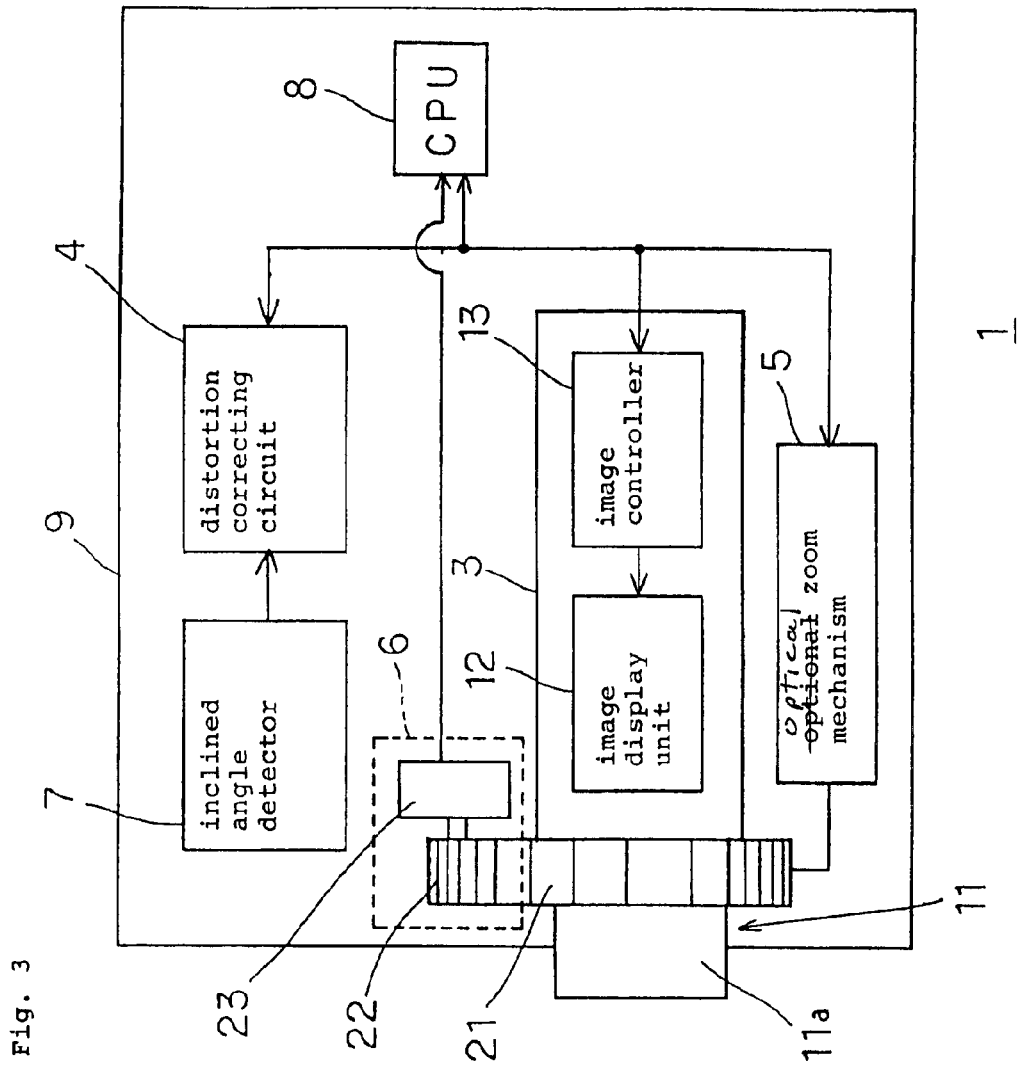
FIG. 3 is a block diagram of a projector according to an embodiment of the present invention.

As shown in FIG. 3, projector 1 according to an embodiment of the present invention comprises projection unit 3 having projection optical system 11 for projecting images onto a projection surface such as a screen or the like, distortion correcting circuit 4 as a distortion correcting means for correcting distortion of images projected onto the projection surface, optical zoom mechanism 5 as an optical zoom means for enlarging and reducing images projected onto the projection surface, and zoom setting detector 6 as a zoom setting detecting means for detecting a zoom setting established by optical zoom mechanism 5.

Projector 1 also has inclined angle detector 7 for detecting angles by which the optical axis of projector 1, along which images are projected onto the projection surface, is oblique to the projection surface in respective vertical and horizontal directions, CPU (Central Processing Unit) 8 for controlling projection unit 3, distortion correcting circuit 4, and optical zoom mechanism 5, and housing 9 accommodating the above components of projector 1 therein.

Projection unit 3 has projection optical system 11 for projecting images onto the projection surface, image display unit 12 for displaying thereon images projected onto the projection surface, and image controller 13 for controlling images to be displayed on image display unit 12. Projection optical system 11 has a projecting lens 11a serving as a zoom lens, and is rotatable about the optical axis of projector 1.

Image display unit 12 comprises a transmissive or reflective liquid crystal display panel, for example. Alternatively, a DMD (Digital Micromirror Device) for reflecting incident light from a light source as an image may be employed instead of image display unit 12.

Distortion correcting circuit 4 comprises an image processing LSI circuit (Large-Scale Integrated circuit), and performs an image deforming process for enlarging and reducing an image to position a corrected square image at a predetermined position within a virtual projection range that is generated based on the angles detected by inclined angle detector 7.

Distortion correcting circuit 4 is supplied with corrective data (corrective parameter) generated by CPU 8, which also serves as a corrective data generating means, based on the zoom setting detected by zoom setting detector 6, corrects image distortion based on the corrective data, and outputs a control signal to Image controller 13.

Image display unit 12 is controlled by image controller 13 based on a control signal from distortion correcting circuit 4, and displays a quadrilateral image thereon. Projector 1 projects a corrected square image onto the projection surface.

A distortion correcting process performed by distortion correcting circuit 4 will be described in detail below.

Distortion correcting circuit 4 calculates the coordinates of vertexes of a distortion-free rectangular image at the time the image is projected onto the projection surface along the optical axis which is not oblique to the projection surface in both vertical and horizontal directions. When the zoom setting is changed by optical zooming mechanism 5, since the distortion-free rectangular image is enlarged or reduced, the coordinates of the vertexes of the distortion-free rectangular image change. Therefore, distortion correcting circuit 4 calculates the coordinates of the vertexes of the distortion-free rectangular image based on the corrective data depending on the zoom setting.

Then, distortion correcting circuit 4 rotates the coordinates of the vertexes of the image according to three-dimensional coordinate rotation equations and calculates the coordinates of vertexes of a quadrilateral image which suffers distortion as it is projected onto the projection surface along the optical axis that is oblique to the projection surface in both the vertical and horizontal directions (hereinafter referred to as oblique projection).

Then, distortion correcting circuit 4 performs an image deforming process, to be described later, within the projected range of the distorted quadrilateral image to generate a corrected rectangular image having a desired aspect ratio, and calculates the coordinates of vertexes of the corrected image.

Finally, distortion correcting circuit 4 rotates the coordinates of the vertexes of the corrected rectangular image according to an inversion of three-dimensional coordinate rotation equations, and calculates the coordinates of vertexes of an image to be generated on image display unit 12, thereby generating a display image.

According to an example of the above image deforming process, distortion correcting circuit 4 automatically corrects an image to be projected such that one of the vertexes located on the opposite ends of at least one of the two diagonal lines of a square corrected image is positioned on a side of the outer edge of the projected range of the image, and the other one of the vertexes is positioned on a side adjacent to that side. Stated otherwise, distortion correcting circuit 4 performs the image deforming process to enlarge and reduce the corrected image to maximize one of the diagonal lines of the corrected image in the projected range of the image, and simultaneously performs the image deforming process to enlarge and reduce the corrected image to position the other diagonal line of the corrected image within the projected range.

Inclined angle detector 7 is electrically connected to distortion correcting circuit 4, and has various sensors, not shown, including an acceleration sensor for detecting gravitational acceleration and an optical sensor for detecting the relative positions of the projection surface and projector 1. Inclined angle detector 7 calculates a vertically inclined angle of the optical axis with respect to the projection surface from the detected result from the acceleration sensor, and also calculates a horizontally inclined angle of the optical axis with respect to the projection surface from the detected result from the optical sensor.

Optical zoom mechanism 5 comprises ring gear 21 mounted on the outer circumferential surface of projection lens 11a, a drive gear (not shown) held in driving mesh with ring gear 21, and a zoom motor (not shown) for rotating the drive gear. When the zoom motor is energized, it causes the drive gear to rotate ring gear 21 about the optical axis of projection optical system 11. Projection lens 11a is moved along the optical axis between a wide angle end and a telephoto end to enlarge and reduce an image that is projected onto the projection surface.

Zoom setting detector 6 comprises detecting gear 22 meshing with ring gear 21 of optical zoom mechanism 5, and detector 23 as a detecting element for detecting an angular displacement of detecting gear 22. Detector 23 is electrically connected to CPU 8, and outputs an angular displacement of detecting gear 22 to CPU 8.

Figure 4:
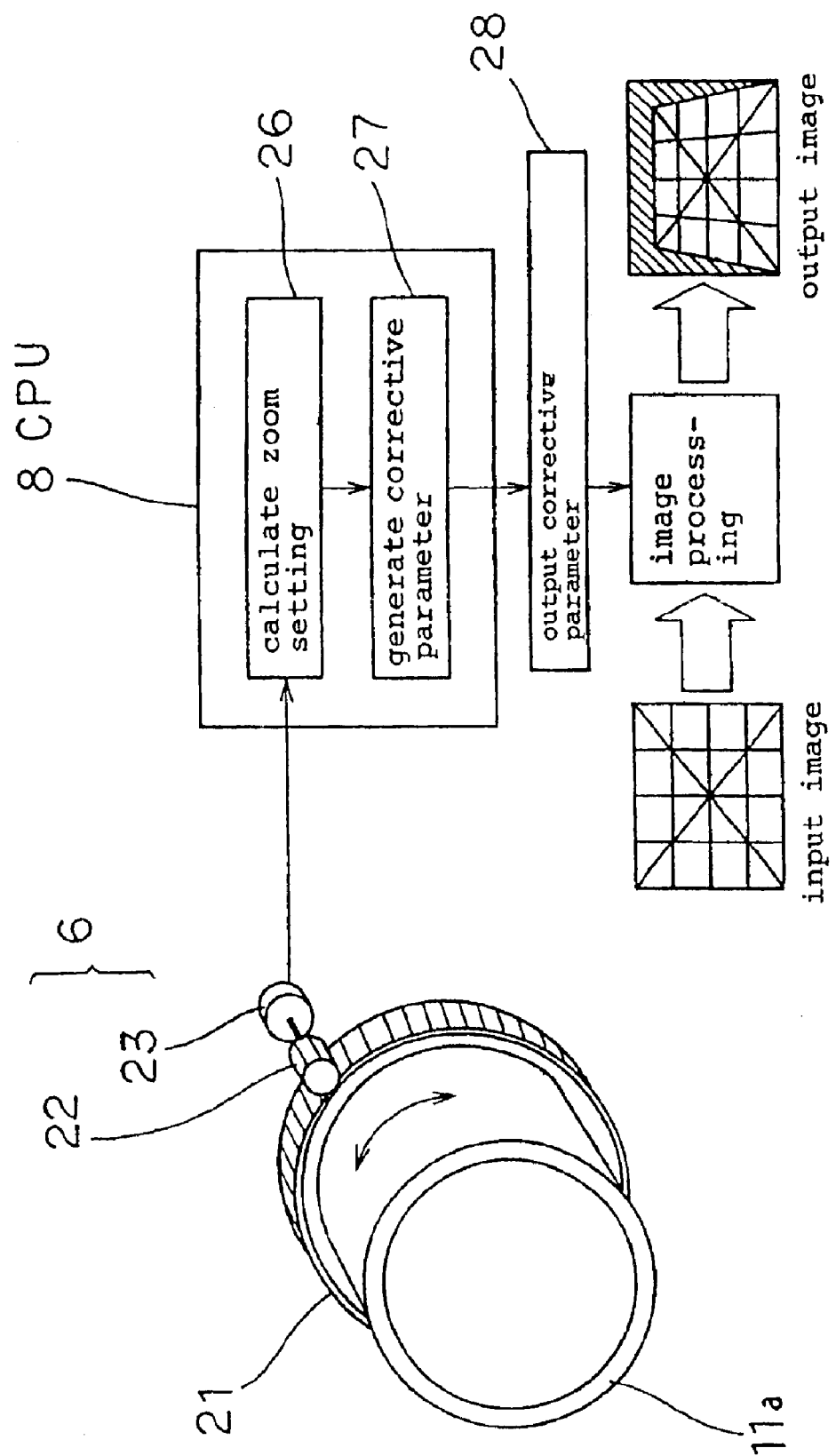
FIG. 4 is a view illustrative of a process of correcting image distortion based on a zoom setting that is detected by a zoom setting detector.

If optical zoom mechanism 5 is actuated to change its zoom setting while distortion correcting circuit 4 is performing its distortion correcting process, CPU 8 calculates, as shown in FIG. 4, a position of projection lens 11a on the optical axis, i.e., a zoom setting of optical zoom mechanism 5, based on the angular displacement of detecting gear 22 which is detected by detector 23 of zoom setting detector 6, in STEP 26. Based on the zoom setting detected by zoom setting detector 6, CPU 8 generates a corrective parameter for distortion correcting circuit 4 to perform its distortion correcting process in STEP 27, and outputs the generated corrective parameter to distortion correcting circuit 4 in STEP 28.

In the present embodiment, CPU 8 calculates the zoom setting of optical zoom mechanism 5 and also serves as the corrective data generating means to generate corrective data. However, a zoom setting detecting circuit for detecting a zoom setting and a corrective data generating circuit for generating corrective data may be provided independently of CPU 8.

In projector 1 thus arranged, inclined angle detector 7 detects angles by which the optical axis of projector 1, along which images are projected onto the projection surface, is oblique to the projection surface in respective vertical and horizontal directions, and distortion correcting circuit 4 generates a virtual projection range based on the detected angles. Generating a virtual projection range means generating a theoretical projection range by way of calculations based on the inclined angles in the vertical and horizontal directions, without detecting an actual image that is projected onto the projection surface.

A distortion correcting process at the time the zoom setting is changed by optical zoom mechanism 5 while projector 1 is installed to have its optical axis oblique to the projection surface will briefly be described below with reference to FIGS. 5A, 5B and 6A, 6B.

Figures 5A, 5B:
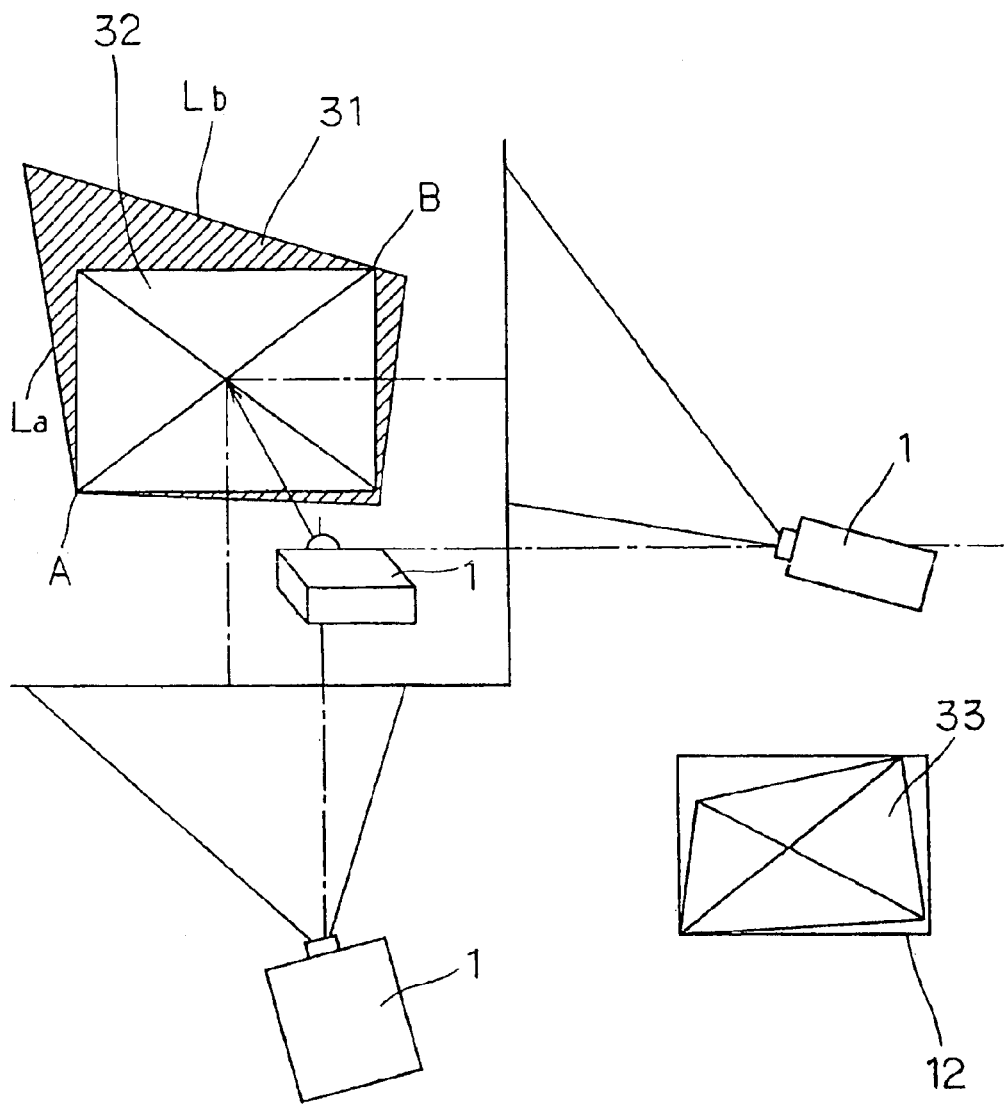
FIG. 5A is a view of a projection surface, showing the manner in which a projected image is corrected at a wide angle end setting.
FIG. 5B is a view of an image displayed on an image display unit.

First, as shown in FIG. 5A, it is assumed that the optical axis of projector 1 is oblique upwardly to the projection surface and oblique leftwardly to the projection surface, and projection lens 11a is moved to the wide angle end by optical zoom mechanism 5.

As shown in FIG. 5A, projector 1 projects image 31 onto the projection surface. Distortion correcting circuit 4 performs an image deforming process to position the lower left vertex A of corrected image 32 on a left side La of the projected range of projected image 31 and also to position the upper right vertex B of corrected image 32 on an upper side Lb of the projected range of projected image 31, thus obtaining corrected image 32. When the above image deforming process is performed, image display unit 12 displays deformed quadrilateral image 33 on its display panel, as shown in FIG. 5B.

Figures 6A, 6B:
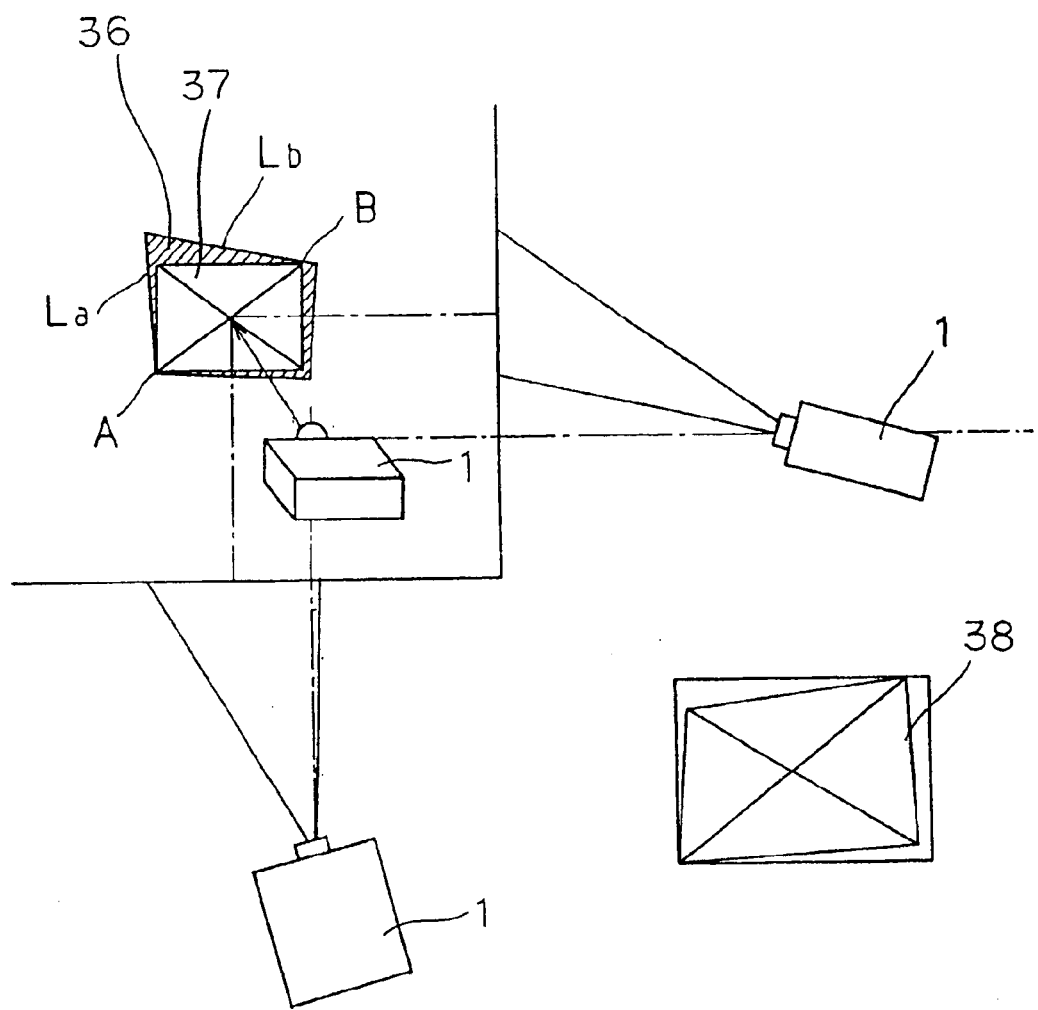
FIG. 6A is a view of a projection surface, showing the manner in which a projected image is corrected at a telephoto end setting.
FIG. 6B is a view of an image displayed on the image display unit.

Then, as shown in FIG. 6A, it is assumed that the optical axis of projector 1 is oblique upwardly to the projection surface and oblique leftwardly to the projection surface, and projection lens 11a is moved to the telephoto end by optical zoom mechanism 5.

As shown in FIG. 6A, projector 1 projects image 36 onto the projection surface. Distortion correcting circuit 4 performs an image deforming process to position the lower left vertex A of corrected image 37 on a left side La of the projected range of projected image 36 and also to position the upper right vertex B of corrected image 37 on an upper side Lb of the projected range of projected image 36, thus obtaining corrected image 37. When the above image deforming process is performed, image display unit 12 displays deformed quadrilateral image 38 on its display panel, as shown in FIG. 6B.

In FIGS. 5A, 5B and 6A, 6B, the optical axis of projector 1 is shown as being oblique upwardly and leftwardly to the projection surface. If the optical axis of projector 1 is oblique upwardly and rightwardly, downwardly and leftwardly, or downwardly and rightwardly, to the projection surface, image distortion can well be corrected by the above image deforming process.

In the above embodiment, the image deforming process performed by distortion correcting circuit 4 is based on using the diagonal lines of a corrected image within the projected range of a projected image. However, distortion correcting circuit 4 may perform other image deforming processes. According to one of such other image deforming processes, distortion correcting circuit 4 corrects two sides of a projected image in the vertical direction based on a vertically inclined angle of the optical axis with respect to the projection surface. Thereafter, distortion correcting circuit 4 fixes one of the two corrected sides, and the remaining three sides of the projected image are manually moved with respect to the fixed side within the projected range of the projected image to deform the corrected image.

To perform the above other image deforming process, the projector has an inclined angle detector for detecting only a vertically inclined angle of the optical axis with respect to the projection surface, and a manual console for manually entering an adjustment value depending on a horizontally inclined angle of the optical axis with respect to the projection surface. The distortion correcting circuit automatically performs an Image deforming process in the vertical direction based on the vertically inclined angle of the optical axis which is detected by the inclined angle detector. When supplied with an adjustment value depending on a horizontally inclined angle of the optical axis from the manual console, the distortion correcting circuit performs an image deforming process in the horizontal direction based on the adjustment value. Alternatively, the distortion correcting circuit may perform the image deforming process in the vertical direction based on an adjustment value which is manually entered depending on a vertically inclined angle of the optical axis with respect to the projection surface.

As described above, projector 1 has distortion correcting circuit 4 for correcting distorted quadrilateral projected images 31, 36, which are projected onto the projection surface along the optical axis that is oblique vertically and horizontally to the projection surface, into respective square corrected images 32, 37, zoom setting detector 6 for detecting a zoom setting of optical zoom mechanism 5, and CPU 8 for generating corrective data to be set in distortion correcting circuit 4 based on the zoom setting detected by zoom setting detector 6. When the zoom setting is changed while distortion correcting circuit 4 is performing its distortion correcting process, distortion correcting circuit 4 performs the distortion correcting process based on the corrective data that is generated by CPU 8 in view of the zoom setting.

With projector 1 thus arranged, when the optical axis thereof is oblique vertically and horizontally to the projection surface, distortion of projected images can accurately be corrected even if projection lens 11a is zoomed, i.e., moved to the telephoto end or the wide angle end. While preferred embodiments of the present invention have been described using specific terms, such description is for illustrative purposes only, and it is to be understood that changes and variations may be made without departing from the spirit or scope of the following claims.

What is claimed is:

1. A projector comprising:
    a projection optical system for projecting an image onto a projection surface;
    optical zoom mechanism for actuating said projection optical system to enlarge and reduce the image projected onto said projection surface;
    distortion correcting circuit for correcting a distorted quadrilateral image, without repositioning said projector, which is projected onto said projection surface when an optical axis of said projection optical system is oblique to said projection surface in vertical and horizontal directions, into a square corrected image;
    zoom setting detector for detecting a zoom setting of said optical zoom means; and
    corrective data generator for generating corrective data to be set in said distortion correcting means based on the zoom setting detected by said zoom setting detecting means.

2. The projector according to claim 1, wherein said zoom setting detector comprises:
    a detecting gear rotatable in ganged relation to said projection optical system which is actuated by said optical zoom mechanism; and
    a detecting element for detecting an angular displacement of said detecting gear.

3. The projector according to claim 2, wherein said optical zoom mechanism comprises:
    a ring gear mounted on an outer circumferential surface of a projection lens of said projection optical system, said detecting gear being in mesh with said ring gear.

4. The projector according to claim 1, wherein said distortion correcting circuit corrects said projected image such that one of vertexes located on the opposite ends of one of the two diagonal lines of the square corrected image is positioned on a side of the outer edge of a projected range of the projected image, and the other one of the vertexes is positioned on a side adjacent to said side.

5. The projector according to claim 1, wherein said distortion correcting circuit corrects said projected image by correcting two sides of the projected image in the vertical direction based on a vertically inclined angle of said optical axis with respect to said projection surface, fixing one of the two corrected sides, and manually moving the remaining three sides of the projected image with respect to the fixed side within the projected range of said projected image.

6. A method of correcting image distortion, comprising the steps of:
    providing a projector having a projection optical system for projecting an image onto a projection surface, and optical zoom mechanism for actuating said projection optical system to enlarge and reduce the image projected onto said projection surface;
    detecting a zoom setting of said optical zoom mechanism;
    generating corrective data based on the zoom setting which is detected; and
    correcting a distorted quadrilateral image, without repositioning said projector, which is projected onto said projection surface when an optical axis of said projection optical system is oblique to said projection surface in vertical and horizontal directions, into a square corrected image based on said corrected data which is generated.

7. The method according to claim 6, wherein said step of correcting a distorted quadrilateral image comprises the step of correcting said projected image such that one of vertexes located on the opposite ends of one of the two diagonal lines of the square corrected image is positioned on a side of the outer edge of a projected range of the projected image, and the other one of the vertexes is positioned on a side adjacent to said side.

8. The method according to claim 6, wherein said step of correcting a distorted quadrilateral image comprises the step of correcting said projected image by correcting two sides of the projected image in the vertical direction based on a vertically inclined angle of said optical axis with respect to said projection surface, fixing one of the two corrected sides, and manually moving the remaining three sides of the projected image with respect to the fixed side within the projected range of said projected image.

* * * * *